United States Patent [19]

Iino

[11] Patent Number: 4,887,428
[45] Date of Patent: Dec. 19, 1989

[54] HYDRAULIC CONTROL DEVICE FOR A CONTINUOUSLY VARIABLE TRANSMISSION FOR MOTOR VEHICLES

[75] Inventor: Takashi Iino, Saitama, Japan

[73] Assignee: Honda Giken Kogyo Kabushiki Kaisha, Tokyo, Japan

[21] Appl. No.: 224,901

[22] Filed: Jul. 27, 1988

[30] Foreign Application Priority Data

Jul. 31, 1987 [JP] Japan .................. 62-192347

[51] Int. Cl.$^4$ .................................... F16D 31/02
[52] U.S. Cl. ................................. 60/468; 60/487
[58] Field of Search ............. 60/459, 465, 468, 494, 60/487, 488, 490, 491, 492

[56] References Cited

U.S. PATENT DOCUMENTS

| | | | |
|---|---|---|---|
| 3,555,817 | 1/1971 | Hann | 60/468 X |
| 4,337,587 | 7/1982 | Presley | 60/468 X |
| 4,776,165 | 10/1988 | Iino | 60/468 X |

Primary Examiner—Edward K. Look
Attorney, Agent, or Firm—Lyon & Lyon

[57] ABSTRACT

A hydraulic control device for a continuously variable vehicle transmission having a closed hydraulic circuit disposed between a hydraulic pump and a hydraulic motor, with at least one of said hydraulic pump and said hydraulic motor being of the variable displacement type. The hydraulic pump is driven by an engine and the hydraulic motor is connected to the road wheels and is driven by hydraulic pressure from the hydraulic pump. A pair or relief valves are disposed between the two oil passages of the closed hydraulic circuit extending between the hydraulic pump and the hydraulic motor, each of which are for relieving the pressure from one oil passage to the other oil passage. One relief valve relieves the pressure from the oil passage which has the higher pressure when the continuously variable transmission is driven by driving forces from the engine to drive the road wheels, and has a relief pressure setting controlled so as to increase as the speed of rotation of the engine increases. The other relief valve which relieves the pressure from the other oil passage which increases in pressure when said continuously variable transmission receives driving forces from the road wheels, has a relief pressure setting controlled so as to increase as the speed of the motor vehicle increases.

7 Claims, 2 Drawing Sheets

HYDRAULIC CONTROL DEVICE FOR A CONTINUOUSLY VARIABLE TRANSMISSION FOR MOTOR VEHICLES

The present invention relates to a hydraulic control device for a continuously variable vehicle transmission of the type employing a hydraulic pump and a hydraulic motor and, in particular, for controlling the hydraulic clutch mechanism of such a transmission.

Japanese Laid-Open Patent Publication No. 59-95722 discloses a continuously variable transmission comprising a hydraulic pump and a hydraulic motor which are interconnected in a closed circuit, in which one or both of the hydraulic pump and the hydraulic motor are of a variable displacement, and a bypass passage capable of providing communication between the high pressure and low pressure oil passages of the closed circuit which are disposed between the hydraulic pump and the hydraulic motor, with the opening in the bypass passage being controlled by a restrictor or clutch valve for controlling the transmission.

With the above known transmission control, the amount of opening of the restrictor is controlled dependent on the opening of the throttle valve of an engine associated with the transmission and the speed of rotation of the engine. When the motor vehicle with the transmission is started normally, the clutch valve is turned on while the engine speed is low. When the motor vehicle is started suddenly or uphill, the engine speed is first increased up to a maximum torque level in order to produce sufficient engine torque and then the clutch valve is turned on. To control the restrictor or clutch valve, therefore, it is necessary to employ the throttle valve opening as a controlling factor as well as the engine rotational speed. Controlling the restrictor to control the transmission is also disadvantageous in that since the viscosity of the oil in the transmission varies with the ambient temperature, it is difficult to accurately control the torque transmitted by the transmission, which results in difficulty in starting to move the motor vehicle smoothly.

According to the present invention, a hydraulic control device for a continuously variable transmission for a motor vehicle has a pair of relief valves disclosed between the two oil passages of the closed hydraulic circuit extending between the hydraulic pump and a hydraulic motor, each for relieving a pressure from one of the oil passages to the other oil passage when the pressure in said one oil passage is higher than the pressure in the other oil passage. One of the relief valves which relieves the pressure from one of the oil passages which increases in pressure when said continuously variable transmission is driven by driving forces from the engine to drive the road wheels, has a relief pressure setting controlled so as to increase as the speed of rotation of the engine increases. The other relief valve which relieves the pressure from the other oil passage which increases in pressure when said continuously variable transmission receives the driving forces from the road wheels, has a relief pressure setting controlled so as to increase as the speed of the motor vehicle increases.

With the hydraulic control device of the above arrangement, the relief pressure setting of one of the relief valves is controlled dependent on the engine rotational speed, and the starting of the vehicle can accurately be controlled only based on the engine rotational speed without employing the opening of a throttle valve as a controlling factor. Since the torque transmitted by the transmission is proportional to the hydraulic pressure in the closed hydraulic circuit, the transmitted torque itself can be controlled by controlling the hydraulic pressure, and is not affected by changes in the oil temperature. Thus, the motor vehicle can be started very smoothly at all times.

If the relief pressure setting of the relief valve were always controlled so as to increase as the engine rotational speed increases, when the vehicle is stopped by idle inertia-dependent movement, the transmission ratio (the ratio between the speeds of rotation of input and output shafts of the transmission) is normally controlled so as to be greater as the vehicle is stopped, engine braking would be applied to increase the engine rotational speed, and the relief pressure setting would then be increased resulting in intensive engine braking. Thus, the motor vehicle could not be smoothly stopped. When the motor vehicle is started downhill on its idle movement from a stop, if the engine is idling and the relief pressure setting were substantially zero, then no engine braking would be applied even upon an increase in the vehicle speed as the vehicle runs downhill. Because the engine speed would not be increased and the relief pressure setting would not rise, no engine braking would be exerted.

According to the present invention, when the transmission is driven by the road wheels as when the vehicle is stopped by idle inertia-dependent movement or started downhill on idle inertia-dependent movement from a stop, the relief pressure setting of the other relief valve which relieves the hydraulic pressure which becomes higher when the transmission is driven by the road wheels is controlled so as to increase as the vehicle speed increases. Therefore, engine braking dependent on the vehicle speed can be obtained.

A preferred embodiment of the present invention will be described hereinbelow with reference to the drawings.

Figure 1:
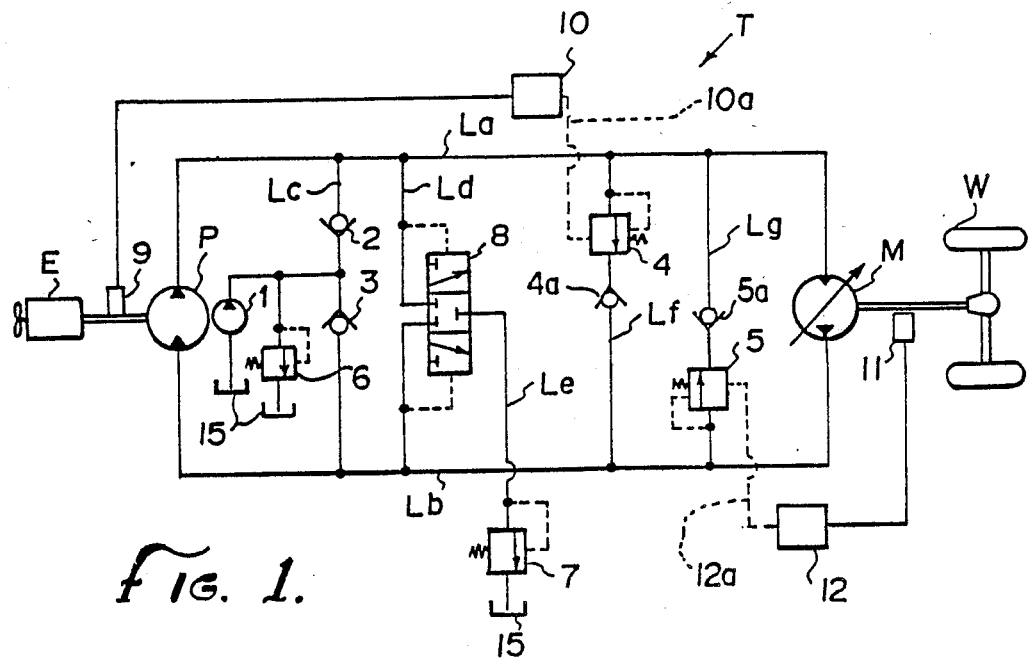
FIG. 1 is a hydraulic circuit diagram of a continuously variable transmission incorporating a hydraulic control device according to the present invention.

FIG. 1 shows a hydraulic circuit of a hydraulically operated continuously variable transmission T according to the present invention, incorporated in a motor vehicle. The continuously variable transmission T has a hydraulic pump P of the fixed displacement type which is drivable by an engine E, and a hydraulic motor M of the variable displacement type for driving road wheels W. The hydraulic pump P and the hydraulic motor M are connected in a closed hydraulic circuit having a first oil passage La communicating between the outlet port of the pump P and the inlet port of the motor M and a second oil passage Lb communicating between the inlet port of the pump P and the outlet port of the motor M. The first oil passage La becomes higher in hydraulic pressure (and the second oil passage Lb becomes lower) when the pump P is driven by the engine E to develop hydraulic pressure to rotate the motor M to drive the road wheels W, i.e., when the road wheels W are driven by the engine E through the continuously variable transmission T. The second oil passage Lb becomes higher in hydraulic pressure (and the first oil passage Lb becomes lower) when engine braking is applied by driving forces from the road wheels W as when the motor vehicle is decelerated.

A charging pump 1 that is actuatable by the pump P has an outlet port connected to the closed circuit through a third oil passage Lc having a pair of check valves 2, 3. Working oil pumped up from an oil sump 15 by the charging pump 1 and regulated in pressure by a charging pressure relief valve 6 is supplied to one of the two oil passages La, Lb which is lower in hydraulic pressure, through the corresponding one of the check valves 2, 3. A fourth oil passage Ld connected to the closed circuit has a shuttle valve 8 to which a fifth oil passage Le is connected and leads to the oil sump 15. Any excessive oil supplied from the charging pump 1 is drained to the oil sump 15 through the fifth oil passage Le that is connected to the lower-pressure one of the first and second oil passages La, Lb via the shuttle valve 8. The fifth oil passage Le has a lower-pressure relief valve 7 set lower than pressure relief valve 6 for regulating the hydraulic pressure in the lower-pressure one of the first and second oil passages La, Lb.

The closed hydraulic circuit further includes sixth and seventh oil passages Lf, Lg connected between the first and second oil passages La, Lb. The sixth oil passage Lf has a first check valve 4a for allowing the working oil to flow only from the first oil passage La to the second oil passage Lb through a first higher-pressure relief valve 4 which relieves hydraulic pressure from the first oil passage La to the second oil passage Lb when the hydraulic pressure in the first oil passage La is higher than desired and than that in the second oil passage Lb. The seventh oil passage Lg also has a second check valve 5a for allowing the working oil to flow only from the second oil passage Lb to the first oil passage La through a second higher-pressure relief valve 5 which relieves hydraulic pressure from the second oil passage Lb to the first oil passage La when the hydraulic pressure in the second oil passage Lb becomes higher than that in the first oil passage La. To the first higher-pressure relief valve 4, there is connected a first pilot pressure line 10a for variably controlling the relief pressure setting for the first higher-pressure relief valve 4. The first pilot pressure line 10a is supplied with a pilot pressure commensurate with an engine rotational speed as detected by an engine speed sensor 9, from a first pilot pressure generator 10. Therefore, the relief pressure level for the first oil passage La increased by the first higher-pressure relief valve 4 as the speed of rotation of the engine E increases. Likewise, to the second higher-pressure relief valve 5, there is connected a second pilot pressure line 12a coupled to a second pilot pressure generator 12 for being supplied with a pilot pressure commensurate with a vehicle speed as detected by a vehicle speed sensor 11. Therefore, the relief pressure level for the second oil passage Lb is increased by the second higher-pressure relief valve 5 as the speed of travel of the vehicle increases.

Figure 2:
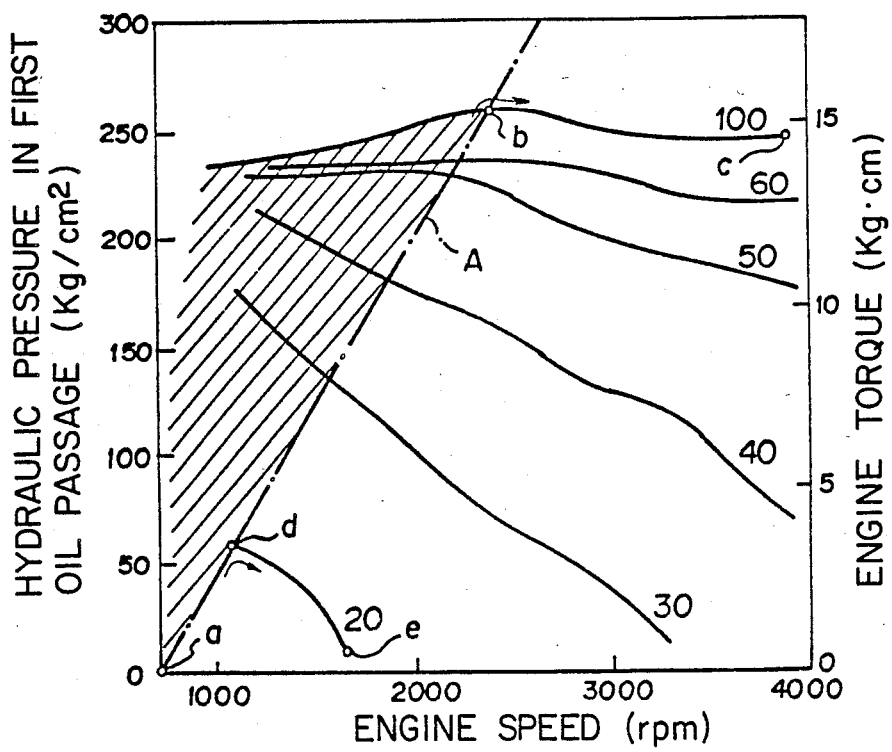
FIG. 2 is a graph showing the engine torque and the hydraulic pressure in a first oil passage, plotted against the engine rotational speed when the continuously variable transmission is driven by the engine.

The manner in which the hydraulic pressure is controlled while the motor vehicle is operated with the continuously variable transmission T having the hydraulic circuit thus constructed will be described. FIG. 2 shows the engine torque and the hydraulic pressure in the first oil passage La plotted against the engine rotational speed with respect to different amounts of throttle valve opening (%) when the continuously variable transmission T is driven by the engine E to rotate the road wheels W. A straight line A indicated by the dot-and-dash line represents the relief pressure setting of the first higher-pressure relief valve 4, and a hatched area indicates a pressure relief area, i.e., a partly engaged clutch area. When starting the motor vehicle by depressing the accelerator pedal to fully open the throttle valve (100%), the engine rotational speed and the hydraulic pressure in the first oil passage La increase from a point a (at which the engine is idling and the hydraulic pressure in the first oil passage La is zero) along the straight line A to a point b where the straight line A intersects with a curve representing the throttle valve opening of 100%. Thereafter, the engine rotational speed and the hydraulic pressure in the first oil passage La vary along the curve indicating the throttle valve opening of 100% toward a point c as indicated by the arrow. When starting the motor vehicle by opening the throttle valve to 20%, the engine rotational speed and the hydraulic pressure in the first oil passage La increase from the point a along the straight line A up to a point d where the straight line A crosses a curve representing the throttle valve opening of 20%, and thereafter vary along that curve toward a point e.

Thus, the motor vehicle can be started smoothly simply by controlling the relief pressure setting for the first higher-pressure relief valve 4 dependent on the engine rotational speed. The hydraulic pressure which is controlled at this time is proportional to the torque transmitted by the transmission, and hence the transmitted torque car accurately be controlled irrespective of chances in the oil temperature.

Figure 3:
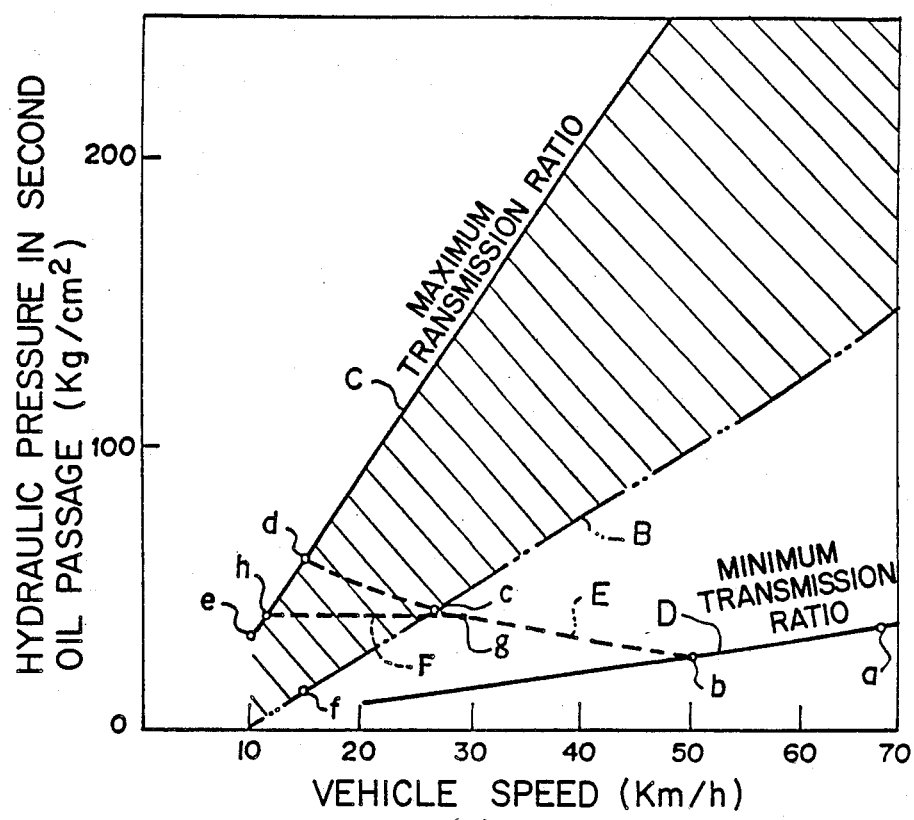
FIG. 3 is a graph showing the hydraulic pressure in a second oil passage plotted against the vehicle speed when the continuously variable transmission is driven by the road wheels.

FIG. 3 shows the hydraulic pressure in the second oil passage Lb plotted against the vehicle speed when the motor vehicle is subjected to engine braking under driving forces applied from the road wheels W to the transmission T such as when stopping the motor vehicle by idle inertia-dependent movement thereof. A straight line B indicated by the two-dot-and-dash line represents the relief pressure setting of the second higher-pressure relief valve 5, and the two straight lines C, D indicated by the solid lines represent the hydraulic pressure in the second oil passage Lb with respect to the vehicle speed when the transmission ratio of the continuously variable transmission T is maximum (line C) and the hydraulic pressure in the second oil passage Lb with respect to the vehicle speed when the transmission ratio is minimum (line D). A hatched area between the straight lines B, C indicates a pressure relief area, i.e., a partly engaged clutch area.

An example of the operation of the control device will be described in which the vehicle is stopped by idle inertia dependent movement after it runs at a point a where the vehicle speed is about 70 km/h and the transmission ratio is minimum. Until the vehicle speed reaches 50 km/h, the vehicle speed is lowered along the straight line D down to a point b while the transmission ratio is at a minimum. Then, since the transmission ratio is increased as the vehicle speed is lowered, the vehicle speed is reduced while the hydraulic pressure in the second oil passage Lb is increasing along a curve E indicated by the broken line. When the vehicle speed is lowered down to a point c where the curve E crosses the straight line B, the second higher-pressure relief valve 5 is operated to reach a partly engaged clutch condition in which the vehicle speed is lowered along the straight line B down to a point f. Since the vehicle speed is lowered from the point c to the point f under the partly engaged clutch condition, smooth engine braking can be exerted.

If the second higher-pressure relief valve 5 were not present, the vehicle speed would be lowered from the point c along the curve E to a point d where the curve E crosses the straight line C while the hydraulic pressure in the second oil passage Lb is increasing from the point c. Thereafter, the vehicle speed would be lowered along the straight line C down to a point e. Engine braking would be excessively intensive during the interval from the point c via the point d to the point e.

If the second higher-pressure relief valve 5 were controlled dependent on the engine rotational speed, the vehicle speed would first be reduced from the point a to the point b and then lowered along the curve E while the hydraulic pressure in the second oil passage Lb is increasing as the transmission ratio is on the increase. Inasmuch as the vehicle speed is lowered by varying the transmission ratio from the minimum to the maximum while keeping the engine speed constant, when the hydraulic pressure in the second oil passage Lb would reach a level (at a point g) corresponding to the engine speed, the second higher-pressure relief valve 5 would be operated to cause the vehicle speed to decrease from the point g along a broken line F to a point h where the transmission ratio is maximum, and then the vehicle speed would be reduced along the straight line C to the point e. This hypothetical condition would be better than if no second higher-pressure relief valve 5 were present, but engine braking would be still too intensive because the vehicle speed would be reduced to the point e while the hydraulic pressure would be maintained on the broken line F until the point h is reached.

With the present invention, as described above, the relief valves are disposed between the two oil passages of the closed hydraulic circuit between the hydraulic pump and the hydraulic motor, and one of the relief valves which relieves one of the oil passages that becomes higher in pressure when the transmission is driven by the engine, has its relief pressure setting controlled so as to be higher as the engine rotational speed increases, whereas the other relief valve which relieves the other oil passage that becomes higher in pressure when the transmission receives driving forces from the road wheels, has its relief pressure setting controlled so as to be higher as the vehicle speed increases. Since the relief pressure setting of said one relief valve is controlled dependent on the engine rotational speed, the starting of the motor vehicle can be controlled dependent on the load on the engine by utilizing the engine characteristics without employing the opening of the throttle valve as a controlling factor. Because the torque transmitted by the transmission is proportional to the pressure in the closed circuit, the transmitted torque itself can be controlled by controlling the pressure in closed circuit, so that the torque is not affected by changes in the oil temperature, thus allowing the vehicle to get started highly smoothly. When the transmission receives driving forces from the road wheels, such as when the vehicle is stopped by its idle inertia-dependent movement, the relief pressure setting of the other relief valve is controlled dependent on the vehicle speed for stopping the vehicle with smooth engine braking. At the time of starting the vehicle from a stop downhill on a sloping road by gravity, engine braking starts being applied smoothly as the vehicle speed increases, and hence normal engine braking can be obtained.

The invention claimed is:

1. A hydraulic control device for a continuously variable vehicle transmission having a closed hydraulic circuit disposed between a hydraulic pump and a hydraulic motor, with at least one of said hydraulic pump and said hydraulic motor being of the variable displacement type, said hydraulic pump being driven by an engine and said hydraulic motor being driven by hydraulic pressure from said hydraulic pump for driving road wheels, comprising, a pair of relief valves disposed between two oil passages of said closed hydraulic circuit and extending between said hydraulic pump and said hydraulic motor, each for relieving a pressure from one of said oil passages to the other oil passage, one of said relief valves relieving the pressure from the one of the oil passages which becomes higher in pressure when said continuously variable transmission is driven by driving forces from the engine to drive the road wheels and having a relief pressure setting controlled so as to increase as the speed of rotation of the engine increases, and the other relief valve relieving the pressure from the other oil passage which becomes higher in pressure when said continuously variable transmission receives driving forces from the road wheels and having a relief pressure setting controlled so as to increase as the speed of the motor vehicle increases.

2. The control device of claim 1 wherein a charging pump is provided and connected through valve means to said two oil passages for supplying oil to the intake of either the hydraulic pump or the hydraulic motor as required during pumping generation of the hydraulic pump or hydraulic motor.

3. The control device of claim 1 wherein valve means are provided for maintaining a predetermined pressure on the intake of either the hydraulic pump or hydraulic motor during pumping operation of the hydraulic pump or hydraulic motor.

4. The control device of claim 1 wherein a check valve is provided in series with each said relief valve for preventing flow in a direction opposite to the pressure relieving function of each relief valve.

5. The hydraulic control device for a continuously variable vehicle transmission having a hydraulic pump and a hydraulic motor connected by a closed hydraulic circuit wherein said pump and motor each having a pressure outlet, comprising, relief valve means connected to each of said pressure outlets, means for controlling said relief valve means to reduce the pressure on the outlet of said motor in response to a reduction in vehicle speed and to increase the pressure on the outlet of said pump in response to an increase in the speed of an engine driving the transmission.

6. The control device of claim 5 wherein two separate relief valve means are provided with one connected to the motor outlet and the other connected to the pump outlet.

7. The control device of claim 6 wherein a check valve is provided with each of the two relief valve means to prevent reverse flow therethrough.

* * * * *